United States Patent Office 3,004,025
Patented Oct. 10, 1961

3,004,025
OXAZINES
Marcus G. Van Campen, Jr., Berkeley, Calif., and Charles H. Tilford and Edwin R. Andrews, Cincinnati, Ohio, assignors to Richardson-Merrell Inc., a corporation of Delaware
No Drawing. Filed Jan. 21, 1958, Ser. No. 710,173
6 Claims. (Cl. 260—244)

This application is a continuation-in-part of our co-pending application Serial No. 385,716, filed October 12, 1953, now abandoned.

This invention relates to a new group of chemicals, most of which are useful as diuretics, a number of which have useful antifungal properties, and a number of which have both diuretic and antifungal activity. As to those which exhibit diuretic activity, some are highly potent, exhibiting an activity on oral administration similar to that of the highly potent mercurial diuretics on intramuscular administration. Others have a somewhat lesser potency, in between that of the mercurial diuretics and theophylline, and others have an activity similar to that of theophylline. The compounds are active on oral or parenteral administration, cause the urinary elimination of water and sodium, are free from irritation to the gastric mucosa characteristic of orally active diuretics presently available and have a relatively low toxicity.

With respect to antifungal activity, this has been determined by in vitro tests against representative fungae such as *Blastomyces dermatidis*, *Histoplasma capsulatum*, *Microsporum audouini*, *Nocardia asteroides* and *Trychophyton rubrum*.

The new compounds can be used as diuretics orally in doses ranging between 10 mg. and 500 mg. daily, and parenterally between about 10 mg. and 100 mg. daily. As anti-fungal agents the compounds can be used topically and incorporated into creams, ointments or lotions in concentrations up to about 10 percent.

The new compounds are oxazines and can be represented by the formula:

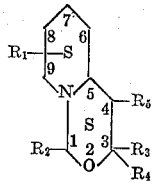

in which S indicates that the ring is saturated, $R_1$ is hydrogen, methyl or ethyl; $R_2$ is hydrogen, methyl or ethyl; $R_3$ and $R_4$ are phenyl, lower alkyl phenyl, lower alkoxy phenyl, halophenyl, $C_2$ to $C_{11}$ alkyl, $C_5$ to $C_9$ cycloalkyl or substituted (including endo-substituted) cycloalkyl, monocyclic heterocyclic, or together form a spiro structure with the carbon atom to which they are attached; and $R_5$ is hydrogen, $C_1$ to $C_6$ alkyl or phenyl; with the proviso that $R_3$ and $R_4$ together have at least 5 carbon atoms.

In $R_3$ and $R_4$, preferably, the alkyl groups are $C_4$ to $C_{11}$ and more preferably $C_6$ to $C_{11}$. The monocyclic heterocyclic radical is preferably pyridyl. The spiro structures (i.e., —$CR_3R_4$—) are preferably indanylidene, fluorenylidene, acenaphthylidene, cyclohexylcyclohexylidene, camphanylidene, fenchylidene and anisylcyclohexylidene.

As illustrations of the level of activity of these compounds, 3-phenyl-3-cyclohexyl and 3-phenyl-3-cycloheptyloctahydropyrid[1,2-c]oxazine have activities on oral administration similar to that of the highly potent mercurial diuretics on intramuscular injection, while 3-cyclohexyl - 3 - n - hexyl - octahydropyrid[1,2 - c] oxazine has an activity similar to that of theophylline. The most potent diuretics are those oxazines containing two substituents of the aryl or cycloalkyl type.

These new compounds can be prepared as free bases, as acid addition salts or as quaternary ammonium salts, such as the metho- or ethobromides, and will ordinarily be used in the form of an acid addition salt, such as the hydrochloride, hydrobromide, or salt with other acid, or in the form of a quaternary ammonium salt, such as the methobromide. These salts in general are soluble and are suitable for parenteral use, although as a general rule, the activity of the compounds on oral administration is such that the compounds will ordinarily be used in a form suitable for oral administration.

The compounds are conveniently prepared by the condensation of piperidine ethanols with formaldehyde, acetaldehyde or propionaldehyde, as illustrated by the following equation for the condensation of alpha,alpha-diphenyl-2-piperidine ethanol with formaldehyde to form 3,3 - diphenyloctahydropyrid[1,2 - c]oxazine, in which $R=H$.

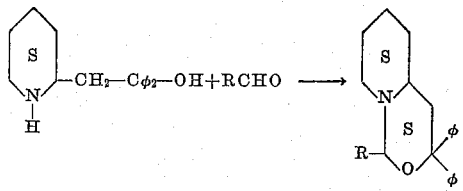

The piperidine ethanols which are condensed with the aldehydes to form the new oxazines of the invention are conveniently prepared by the procedures described in applications Serial Nos. 275,470, filed March 7, 1952; 315,406, filed October 17, 1952; and 384,784, filed October 7, 1953.

The invention will be illustrated by the following examples but it is not limited thereto.

EXAMPLE 1

*3,3 - diphenyloctahydropyrid[1,2 - c]oxazine.*—This compound was obtained by refluxing a mixture of 31.7 grams of alpha,alpha-diphenyl-2-piperidineethanol.HCl, 10.5 grams of formalin, and 200 ml. of methanol for about 12 to 16 hours followed by evaporation to a volume of 100 ml. and dilution with 3 volumes of ethyl acetate. The hydrochloride, melting at 224–226°, precipitated when the solution was cooled. It has diuretic properties.

EXAMPLE 2

*3- p - tolyl - 3 - phenyloctahydropyrid[1,2 - c]oxazine.*—This compound was obtained from alpha-p-tolyl-alpha-phenyl-2-piperidineethanol by the procedure of Example 1. The hydrochloride melted at 140° with decomposition. It has diuretic and antifungal properties.

EXAMPLE 3

*3,3 - di - (p - anisyl) - octahydropyrid[1,2 - c]oxazine.*—Alpha,alpha - di - (p - anisyl) - 2 - piperidineethanol.HCl melting at 177–179° was obtained by the hydrogenation of alpha-alpha-di-(p-anisyl)-2-pyridineethanol by shaking the base with slightly less than the equivalent amount of alcoholic HCl with a platinum oxide catalyst in the Parr hydrogenator. Conversion of this hydrochloride to the desired pyridoxazine hydrochloride melting at 218–220° was carried out using the procedure of Example 1. It has diuretic and antifungal properties.

EXAMPLE 4

*3-(2-pyridyl)-3-phenyloctahydropyrid[1,2-c]oxazine.*—The intermediate 2-phenacylpiperidine.HCl melting at 167-169° was obtained by the hydrogenation of 2-phenacylpyridine (60 grams) in 150 ml. of methanol containing 25.5 ml. of 43% alcoholic HCl and 0.8 gram of PtO$_2$. The reaction was stopped after 0.9 mole of hydrogen had been taken up. A semicarbazone melting at 217-218° dec. was obtained, indicating that the keto group had not been reduced. To 2-pyridyl lithium from 5 grams of lithium, 45 grams of butyl bromide and 47 grams of 2-bromopyridine was added 17 grams of 2-phenacyl piperidine (obtained by treatment of the above hydrochloride with 10% sodium hydroxide followed by extraction with ether) over a period of 10 minutes at —35° C. The reaction mixture was decomposed with dilute ammonium chloride, filtered, and the precipitate washed with petroleum ether and water; M.P. 168-173°; the product, alpha-2-pyridyl-alpha-phenyl-2-piperidineethanol, was recrystallized from 90% methanol; M.P. 181-183°. The above product (5.5 grams), 2.2 ml. of formalin, and 20 ml. of methanol was refluxed 16 to 24 hours, cooled, and filtered; giving 3-(2-pyridyl)-3-phenyl-octahydropyrid[1,2-c]oxazine melting at 148-150°. It has diuretic, but little or no, antifungal properties.

EXAMPLE 5

3 - cyclohexyl-3-phenyloctahydropyrid[1,2-c]oxazine.—
Catalytic hydrogenation, using a platinum oxide catalyst, of alpha-cyclohexyl-alpha-phenyl-2-pyridineethanol.HCl gave alpha-cyclohexyl-alpha-phenyl-2-piperidineethanol.HCl, melting at 206-208°. This hydrochloride in methanol with formalin using the procedure of Example 1 was converted to the 3-cyclohexyl-3-phenyloctahydropyrid[1,2-c]oxazine.HCl melting at 267-268° dec. The free base, M.P. 124-125° (7.3 grams) was heated in closed container with 10 ml. of 77% methyl bromide in methanol with 25 ml. of methanol for 2 days and filtered giving 3-cyclohexyl-3-phenyloctahydropyrid[1,2-c]-oxazine methobromide; M.P. 288-289° dec. The compound of this example is a very potent diuretic, having a potency, on oral administration, comparable to that of highly potent mercurial diuretics on intramuscular injection.

EXAMPLE 6

3 - (4-methylcyclohexyl)-3-phenyloctahydropyrid[1,2-c]oxazine. — Alpha-4-methylcyclohexyl-alpha-phenyl-2-piperidineethanol.HCl was converted to 3-(4-methylcyclohexyl) - 3 - phenyloctahydropyrid[1,2-c]oxazine.HCl melting at 273-275° dec. by the procedure of Example 1. It has diuretic properties.

EXAMPLE 7

3-cycloheptyl-3-phenyloctahydropyrid[1,2-c]oxazine.—
Cycloheptyl phenyl ketone was prepared from cycloheptyl magnesium bromide and benzonitrile by adding benzonitrile to a slight excess of the Grignard reagent from cycloheptyl bromide in ether, decomposing the reaction mixture with 20% HCl and refluxing about an hour to decompose the ketimine. The ether layer was separated and distilled and this not hitherto reported product was collected at 115-117° C./0.2 mm.; it solidified at —10°; its 2,4-dinitrophenylhydrazone melted at 170-171° C. Alpha-cycloheptyl-alpha-phenyl-2-pyridineethanol, M.P. 72-74°, was then prepared from this ketone by adding it to an excess of alpha-picolyl lithium in ether, decomposing the reaction mixture with ammonium chloride solution and filtering. Additional product was obtained by evaporating the ether layer from the filtrate, taking up the residue in petroleum ether, and cooling and filtering. The hydrochloride was then prepared. It melted at 184-186°. Hydrogenation of this hydrochloride by the procedure of Example 3 gave alpha-cycloheptyl-alpha-phenyl-2-piperidineethanol.HCl melting at 190-193°. The free base melted at 84-86°. The reaction of alpha-cycloheptyl-alpha-phenyl - 2 - piperidineethanol.HCl with formalin by the procedure of Example 1 gave 3-cycloheptyl-3-phenyloctahydropyrid[1,2-c]oxazine.HCl melting at 270-272° dec. This product is a highly potent diuretic, of activity similar to that of the product of Example 5.

EXAMPLE 8

3-cyclopentyl-3-phenyloctahydropyrid[1,2-c]oxazine.—
The intermediate alpha-cyclopentyl-alpha-phenyl-(2-piperidine) ethanol was converted to the desired 3-cyclopentyl-3-phenyloctahydropyrid[1,2-c]oxazine.HCL melting at 238-240° dec. by the procedure of Example 1. It has diuretic and antifungal properties.

EXAMPLE 9

3-(1-methyl-3-isopropylcyclopentyl)-3 - phenyloctahydropyrid[1,2-c]oxazine.—The starting alpha-(1-methyl-3-isopropylcyclopentyl) - alpha-phenyl-(2-piperidine) - ethanol.HCL was converted to the hydrochloride of this compound, melting at 191-193°, by the procedure of Example 1. It has diuretic properties.

EXAMPLE 10

3 -n-hexyl-3-phenyloctahydropyrid[1,2-c]oxazine.—The reaction of alpha-n-hexyl-alpha-phenyl-(2-piperidine ethanol.HCl with formalin was carried out using the procedure of Example 1. The pyridoxazine hydrochloride melting at 235-236° was obtained. It has anti-fungal properties. Alpha-isopropyl-alpha-phenyl - 2 - piperidineethanol may be substituted in this procedure to obtain 3-isopropyl-3-phenyl-octahydropyrid[1,2-c]oxazine. The 3-n-amyl, the 3-n-octyl, and the 3-undecyl analogs are obtained from the corresponding intermediates. The use of alpha-phenyl-alpha-n-hexyl - 2-(5-ethyl-piperidine)ethanol in this procedure provides 3-phenyl-3-n-hexyl-7-ethyloctahydropyrid[1,2-c]oxazine.

EXAMPLE 11

3-p-phenetyl-3-phenyloctahydropyrid[1,2 - c]oxazine.—
The intermediate alpha-p-phenetyl-alpha-phenyl-2-pyridineethanol melting at 122-124° was prepared using 4-ethoxybenzophenone. Hydrogenation was carried out using 0.8 of a mole equivalent of HCl, having the base in excess at all times; otherwise the compound decomposes. The melting points of two different fractions melting at 128-130° dec. and 133-135° dec. respectively on standing in sample bottles for 6 months both changed to 166-168°. Conversion of the above hydrochloride to the desired pyridoxazine hydrochloride melting at 210-212° was carried out using the procedure of Example 1. This product has diuretic and antifungal properties.

EXAMPLE 12

3-p-anisyl-3-(m-bromophenyl)octahydropyrid[1,2-c]oxazine.—The intermediate alpha-p-anisyl-alpha-m-bromophenyl-2-pyridineethanol melting at 106-107° was obtained using p-anisyl-m-bromophenyl ketone, alpha-picoline and lithium amide. Hydrogenation of this product gave an unstable alpha-p-anisyl-m-bromophenyl-2-piperidineethanol.HCl melting at 100-105°. A second crop also melted at 100-105°. Dehydration evidently occurred when a sample of the product was recrystallized for analysis, the melting point going up to 134-137°. The unrecrystallized product was converted to the pyridoxazine.HCl melting at 135-138° by the procedure of Example 1. This product has diuretic properties.

EXAMPLE 13

3-p-chlorophenyl - 3 - phenyloctahydropyrid[1,2-c]oxazine. — Hydrogenation of alpha-p-chlorophenyl-alpha-phenyl-2-pyridineethanol.HCl gave alpha-p-chlorophenyl-alpha-phenyl 2-piperidineethanol.HCl melting at 235-236°. Using the procedure of Example 1 this compound was converted to the pyridoxazine hydrochloride melting at 232-234°. This product has antifungal properties.

EXAMPLE 14

*3,3-diphenyl - 9-methyloctahydropyrid[1,2-]oxazine.—* Hydrogenation of alpha,alpha-diphenyl-6-methyl-2-pyridineethanol.HCl was carried out and the alpha,alpha-diphenyl-6-methyl-2-piperidineethanol.HCl, melting at 235–237° was obtained. Conversion of the above compound to the desired pyridoxazine hydrochloride melting at 266–267° dec. was carried out by the process of Example 1. This product has antifungal properties.

EXAMPLE 15

*3,3-di - (p-tolyl)-octahydropyrid[1,2-c]oxazine.—* Hydrogenation of alpha,alpha-di-(p-tolyl)-2-pyridineethanol.HCl gave alpha,alpha-di-(p-tolyl)-2-piperidineethanol hydrochloride melting at 209–210°. Conversion to the pyridoxazine using the above compound, formalin and methanol by the procedure of Example 1 was carried out, and the desired pyridoxazine hydrochloride melting at 236–238° dec. was isolated. This product has antifungal properties.

EXAMPLE 16

*3,3 - dicyclohexyloctahydropyrid[1,2-c]oxazine.—* Hydrogenation of alpha,alpha-dicyclohexyl-2-pyridineethanol.HCl was carried out, and the intermediate, alpha,-alpha-dicyclohexyl-2-piperidineethanol.HCl, melting at 260–262° dec. was obtained. The above hydrochloride was converted to the above pyridoxazine hydrochloride melting at 272–273° dec. by the procedure of Example 1. This product has diuretic properties, but little or no antifungal activity.

EXAMPLE 17

*3-cyclohexyl - 3 - n - hexyloctahydropyrid[1,2-c]oxazine.—* Alpha-cyclohexyl-alpha-n-hexyl-2-piperidineethanol was treated with formalin and methanol by the procedure of Example 1 and the pyridoxazine hydrochloride melting at 250–251° dec. was obtained. This product has diuretic and antifungal properties.

EXAMPLE 18

*3,3-di-(n-hexyl)-octahydropyrid[1,2-c]oxazine.—* Using the procedure of Example 1, alpha,alpha-di-(n-hexyl)-2-piperidineethanol.HCl was converted to the above pyridoxazine hydrochloride melting at 229–230°. This product has antifungal, but little or no, diuretic, properties. By using alpha,alpha-diisobutyl-(2-piperidine)ethanol in place of the alpha,alpha-di-n-hexyl-(2-piperidine)ethanol, 3,3-diisobutyloctahydropyrid[1,2-c]oxazine is obtained. Similarly, alpha,alpha-diheptyl- and alpha-ethyl-alpha-octyl-(2-piperidine) ethanols give the corresponding 3,3-diheptyl- and 3-ethyl-3-octyl-octahydropyridoxazines.

EXAMPLE 19

*3-cyclohexyl - 3-phenyl-1-methyloctahydropyrid[1,2-c]-oxazine.—* A mixture of 2.5 grams of alpha-cyclohexyl-alpha-phenyl-2-piperidineethanol.HCl, 2 grams of acetaldehyde and 20 ml. of ethanol was refluxed 16 hours, evaporated to about half volume and diluted with 3 volumes of ethyl acetate. The solution was cooled and filtered giving the above pyridoxazine.HCl melting at 150–151° dec. This product was unstable and difficult to test.

EXAMPLE 20

*3,3-diphenyl - 1 - methyloctahydropyrid[1,2 - c]oxazine.—* The procedure of Example 19 was followed using alpha,alpha-diphenyl-2-piperidineethanol, and the pyridoxazine free base melting at 87–89° was obtained. The base was purified by dissolving in ether and adding slightly less than an equivalent of alcoholic HCl. The precipitate was recrystallized from ethyl acetate; M.P. 139–141°. This product has diuretic and antifungal properties.

EXAMPLE 21

*3,3-diphenyl - 1 - ethyloctahydropyrid[1,2-c]oxazine.—* The procedure of Example 20 was followed using propionaldehyde in place of the acetaldehyde. The base melted at 91–92°. The hydrochloride melted at 162–164° dec. This product has diuretic and antifungal properties.

EXAMPLE 22

*Spiro(indane - 1,3' - octahydropyrid[1,2-c]oxazine).—* The procedure of Example 1 using 1-(alpha-2-pipecolyl)-1-indanol.HCl was carried out and the desired pyridoxazine hydrochloride melting at 290–291° C. (dec. turning black) was obtained. This product has antifungal properties, but lacks diuretic activity.

EXAMPLE 23

*Spiro(fluorene - 9,3'-octahydropyrid[1,2-c]oxazine).—* The procedure of Example 1 using 9-(alpha-2-pipecolyl)-9-fluorenol.HCl gave this spiropyridoxazine hydrochloride melting at 242–244° dec. This product has diuretic and antifungal properties.

EXAMPLE 24

*Spiro(acenaphthene - 1,3' - octahydropyrid[1,2-c]oxazine).—* The procedure of Example 1 using 1-(alpha-2-pipecolyl)-1-acenaphthenol.HCl was carried out, and this pyridoxazine.HCl melting at 230–232° dec. was obtained. This product has antifungal properties, but lacks diuretic activity.

EXAMPLE 25

*Spiro(2 - cyclohexylcyclohexane - 1,3'-octahydropyrid-[1,2-c]oxazine).—* The procedure of Example 1 using 1-(alpha - 2-pipecoline)-2-cyclohexyl-1 - cyclohexanol.HCl was carried out and the above pyridoxazine.HCl obtained; M.P. 281–282° dec. This product has antifungal and some antibacterial activity, but lacks diuretic activity.

EXAMPLE 26

*Spiro(d-camphane - 1,3' - octahydropyrid[1,2-c]oxazine).—* The procedure of Example 1 using alpha-(alpha-2-pipecolyl)-d-borneol.HCl was followed and the above pyridoxazine.HCl melting at 246–248° dec. was obtained. This product has diuretic and antifungal properties.

EXAMPLE 27

*Spiro(dl-fenchane - 1,3' - octahydropyrid[1,2-c]oxazine).—* The procedure of Example 1 using alpha-(alpha-2-picolyl)-dl-fenchol.HCl was carried out; the pyridoxazine.HCl melted at 245–247° dec. This product has antifungal, but not diuretic properties.

EXAMPLE 28

*Spiro(2 - p-anisylcyclohexane-1,3'-octahydropyrid[1,2-c]oxazine).—* The procedure of Example 1 using 1-(alpha-2-pipecolyl)-2-p-anisyl-1-cyclohexanol.HCl gave the pyridoxazine.HCl melting at 235–236°. This product has diuretic properties.

EXAMPLE 29

*3,3 - diphenyloctahydropyrid[1,2 - c]oxazine methobromide.—* The pyridoxazine hydrochloride of Example 1 was converted to the free base; M.P. 77–79°. A mixture of 4.5 grams of this base, 7 ml. of 77% methyl bromide in methanol and 15 ml. of methanol was heated 48 hours in a capped bottle. The solution was diluted with 2 volumes of ether, cooled, and filtered; M.P. 272–273°.

EXAMPLE 30

*3,3-diphenyl-4-alkyloctahydropyrid[1,2 - c]oxazine.—* 2 propylpyridine, ethyl benzoate, and lithium were condensed by the method of Tchitchibabine (Rec. Trav. Chim. 57, 582). The resulting alpha-ethyl-2-phenacyl-pyridine was collected as the fraction boiling above 135° C. at 0.2 to 0.4 mm. Twenty-three grams of this compound in 100 ml. of anhydrous ether was allowed to react with an ether solution of phenyl lithium obtained from 25 grams of bromobenzene and 2.2 grams of lithium. The resulting alpha,alpha-diphenyl-beta - ethyl-2- pyridineethanol was isolated as a semi-crystalline substance after decomposing the reaction mixture with aqueous ammonium chloride and evaporating the ether solution. By using 2-amylpyridine and 2-hexylpyridine in place of 2-propylpyridine in this procedure the analogous beta-butyl- and beta-amyl-alpha,alpha-diphenyl-2-pyridine ethanols are obtained in crude form suitable for the subsequent use. These beta-alkyl 2-pyridine ethanols are hydrogenated to the analogous beta-alkyl-2-piperidine ethanols by dissolving them in alcohol, adding an 80–90% molar equivalent of hydrogen chloride and shaking under hydrogen at 40–50 lbs./sq. in. with platinum oxide catalyst. The reaction is stopped when somewhat less than 2 equivalents of hydrogen have been absorbed. The mixture is filtered, made slightly alkaline with sodium hydroxide, and evaporated under reduced pressure to a small volume. The crude piperidine ethanols so obtained are difficult to purify and may be used directly in the oxazine formation. The oxazines are obtained by gently refluxing the piperidine ethanols with a slight excess of formalin dissolved in 10 volumes of methanol for one to two days. The solution is then evaporated under reduced pressure to a small volume, chilled and filtered. The oxazines so obtained are somewhat contaminated with by-products and are a mixture of two racemates. The 4-ethyl-3,3-diphenyloctahydropyrid[1,2-c]oxazine was isolated as a tan crystalline material melting over a range above 70° C. The 4-butyl and 4-amyl 3,3-diphenyloctahydropyrid[1,2-c]oxazines were light brown to tan, oily substances melting over a range above 60° C.

Other compounds included in the invention, which exhibit the same general pharmacological properties are shown in the following table. For example, compound No. 2 exhibits diuretic activity but no anti-fungal activity. These compounds of the table were prepared by the procedure of Example 1, except that compound No. 3 was prepared using the glycollate of the piperidine compound instead of the hydrochloride, and converted to the hydrochloride.

Table

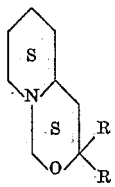

| Compound No. | R | R | M.P., °C. |
|---|---|---|---|
| 1 | Phenyl | i-Propyl | 273–274 (dec.). |
| 2 | i-Butyl | i-Butyl | 244–245 (dec.). |
| 3 | t-Butyl | t-Butyl | 203–205. |
| 4 | Phenyl | n-Amyl | 244–246 (dec.). |
| 5 | do | n-Octyl | 226–228 (dec.). |
| 6 | do | n-Undecyl 2-(Bicyclo) [2,2,1] heptyl | 212–213. |
| 7 | do | | 210–212. |
| 8 | n-Heptyl | n-Heptyl | 206–207. |
| 9 | Ethyl | n-Octyl | 190–192. |

The following examples illustrate suitable pharmaceutical compositions containing the new compounds. In these examples, the quantities are given for single units, it being understood that in actual practice, the dosage forms will be prepared in suitable quantities, and the amounts of materials used adjusted accordingly.

EXAMPLE 31

25 mg. tablets.—Twenty-five mg. of the methobromide of 3-cyclohexyl-3-phenyloctahydropyrid[1,2-c]oxazine (Example 5), 48 mg. of powdered sugar, and 32 mg. of corn starch are mixed and granulated with 10 percent gelatin solution. The granulation is dried and ground to fine granules for tableting. About 1 percent magnesium stearate is added as a lubricant, together with sufficient corn starch to give a weight of 2.5 grains per tablet. The product is compressed on a single punch or rotary machine using a 9/32 inch punch.

EXAMPLE 32

500 mg. tablets.—Five hundred mg. of the hydrochloride of 3-cycloheptyl-3-phenyloctahydropyrid[1,2-c]oxazine (Example 7) in finely powdered form is admixed with 60 mg. of corn starch and 100 mg. of powdered sugar and then granulated with 10 percent gelatin solution. The granulation is dried and ground to size suitable for tableting. About 1 percent magnesium stearate is added as a lubricant, together with sufficient corn starch to give a weight of 700 mg. per tablet. The product is compressed on a single punch or rotary machine using of 7/16 inch punch.

The tablets of Example 31 and Example 32 can be suitably coated if desired, as, for example, with sugar.

EXAMPLE 33

Capsule.—Twenty-five mg. of the methobromide of 3-cyclohexyl-3-phenyloctahydropyrid[1,2-c]oxazine (Example 5) is admixed with corn starch in quantity required to provide sufficient bulk for the desired size capsule, and the mixture is encapsulated.

EXAMPLE 34

Capsule.—Five hundred mg. of the hydrochloride of 3-cycloheptyl-3-phenyloctahydropyrid[1,2-c]oxazine (Example 7) is admixed with sufficient corn starch to give the proper bulk for the desired size capsule, and the mixture is encapsulated.

EXAMPLE 35

Injectable suspension, 100 mg. per ml.—The following ingredients are sterilized separately: 100 mg. of the methobromide of 3-cyclohexyl-3-phenyloctahydropyrid[1,2-c]oxazine (Example 5), 0.1 mg. of Tween 80 and q.s. corn oil to make a final volume of one ml. These ingredients are admixed aseptically. Particle size may be achieved by use of micronized material or by use of a ball mill, maintaining aseptic conditions. The above suspension may be administered subcutaneously and intramuscularly.

EXAMPLE 36

Oral suspension, 500 mg. per 15 ml.—One hundred fifty mg. of Veegum H.V. are hydrated in about 9 ml. of water; 500 mg. of Tween 80, 560 mg. of the hydrochloride of 3-cycloheptyl-3-phenyloctahydropyrid[1,2-c]oxazine (Example 7), color and flavor, as desired, and water q.s. 15 ml. are added; the product is mixed well and homogenized.

EXAMPLE 37

Liquid (syrup) 25 mg. per teaspoon.—Twenty-five mg. of the methobromide of 3-cyclohexyl-3-phenyloctahydropyrid[1,2-c]oxazine (Example 5) is dissolved in one ml. of water. Five mg. of sodium benzoate, 3.5 ml. of liquid sugar, 5 mg. of citric acid, and 0.375 mg. of butoben are added and stirred until dissolved, using gentle heat if necessary. Flavor, as desired, and water q.s. are then added.

EXAMPLE 38

Liquid (syrup) 500 mg. per tablespoon.—Five hundred mg. of the hydrochloride of 3-cycloheptyl-3-phenyloctahydropyrid[1,2-c]oxazine (Example 7) and 4.5 mg. of sugar are dissolved in sufficient water so that after the addition of 2.25 ml. of alcohol U.S.P. and flavor, as desired, the volume is 15 ml.

EXAMPLE 39

Injectable solution, 2 mg. per ml.—Two mg. of the methobromide of 3-cyclohexyl-3-phenyloctahydropyrid[1,2-c]oxazine (Example 5) and water for injection q.s. one ml. are mixed and warmed gently till solution is accomplished. The solution is filtered through fine sintered glass, filled into sterile one ml. ampuls, and sterilized at 250° F. for 30 minutes.

EXAMPLE 40

*1% ointment.*—To a melt of 1.5 lbs. of propylene glycol 6.68 lbs. of polyethylene glycol 400 U.S.P. and 6.68 lbs. of carbowax 4000 U.S.P. is added 0.15 lb. of micropulverized hydrochloride of 3-cyclopentyl-3-phenyloctahydropyrid[1,2-c]oxazine (Example 8). The product is stirred until almost solid and milled if necessary to a smooth ointment. Fill in suitable containers.

EXAMPLE 41

*10% ointment.*—To a melt of 1.5 lbs. of propylene glycol, 6 lbs. of polyethylene glycol 400 U.S.P. and 6 lbs. carbowax, 4000 U.S.P. is added 1.5 lbs. of micropulverized hydrochloride of 3-p-phenetyl-3-phenyloctahydropyrid[1,2-c]oxazine (Example 11). The product is stirred until almost solid and milled if necessary to a smooth ointment. Fill in suitable containers.

The other compounds of Examples 1 to 30 can also be used to prepare pharmaceutical preparations such as those of Examples 31 to 41, depending on the activity and route employed.

We claim:
1. Compounds of the formula:

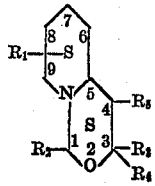

in which $R_1$ is a radical selected from the group consisting of hydrogen, methyl and ethyl radicals; $R_2$ is a radical selected from the group consisting of hydrogen, methyl and ethyl radicals; $R_3$ and $R_4$ are indifferently selected from the group consisting of alkyl groups having 2 to 11 carbon atoms, cycloalkyl groups of 5 to 9 carbon atoms, phenyl, halophenyl, lower alkoxyphenyl, lower alkylphenyl, and pyridyl, and radicals which taken together with the carbon atom to which they are attached form a cyclic group selected from the group consisting of indanylidene, fluorenylidene, acenaphthylidene, cyclohexylcyclohexylidene, camphenylidene, fenchylidene and anisylcyclohexylidene groups; and $R_5$ is selected from the class consisting of hydrogen, alkyl groups having 1 to 6 carbon atoms and phenyl; with the proviso that $R_3$ and $R_4$ together have at least 5 carbon atoms.

2. 3-cyclohexyl-3-phenyloctahydropyrid[1,2-c]oxazine.
3. 3-cycloheptyl-3-phenyloctahydropyrid[1,2-c]oxazine.
4. 3 - cyclohexyl-3-n-hexyloctahydropyrid[1,2 - c]oxazine.
5. 3 - cyclopentyl-3-phenyloctahydropyrid[1,2 - c]oxazine.
6. 3-p-phenetyl - 3 - phenyloctahydropyrid[1,2 - c]oxazine.

References Cited in the file of this patent

Hess: Ber. Deut. Chem., vol 50, pages 1407–12 (1917).
Tilford et al.: J. Am. Chem. Soc., vol. 76, pages 2431–41 (1954).